US012688969B2

(12) United States Patent
Lee et al.

(10) Patent No.: US 12,688,969 B2
(45) Date of Patent: Jul. 21, 2026

(54) METHOD FOR MANUFACTURING COIL COMPONENT

(71) Applicant: SAMSUNG ELECTRO-MECHANICS CO., LTD., Suwon-si (KR)

(72) Inventors: Min Oh Lee, Suwon-si (KR); Jae Kwang Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 619 days.

(21) Appl. No.: 17/947,478

(22) Filed: Sep. 19, 2022

(65) Prior Publication Data

US 2023/0140077 A1 May 4, 2023

(30) Foreign Application Priority Data

Oct. 29, 2021 (KR) ........................ 10-2021-0146407

(51) Int. Cl.
*H01F 41/04* (2006.01)
*H01F 41/071* (2016.01)
(Continued)

(52) U.S. Cl.
CPC ........... *H01F 41/04* (2013.01); *H01F 41/071* (2016.01); *H01F 41/09* (2016.01); *H01F 27/306* (2013.01);
(Continued)

(58) Field of Classification Search
CPC ........ H01F 41/04; H01F 41/071; H01F 41/09; H01F 41/061; H01F 41/0246; H01F 17/0013; H01F 17/045; H01F 27/06; H01F 27/324; H01F 27/306; H01F 41/082; Y10T 29/49073; H02K 3/12
See application file for complete search history.

(56) References Cited

U.S. PATENT DOCUMENTS

2006/0230604 A1* 10/2006 Hashimoto ....... Y10T 29/49073 29/748
2017/0062115 A1 3/2017 Kang et al.
(Continued)

FOREIGN PATENT DOCUMENTS

JP 2003-086446 A 3/2003
JP 2005-353871 A 12/2005
(Continued)

OTHER PUBLICATIONS

Savary et al., "Design, Assembly, and Test of the CERN 2-m Long 11 T Dipole in Single Coil Configuration," in IEEE Transactions on Applied Superconductivity, vol. 25, No. 3, pp. 1-5, Jun. 2015. (Year: 2015).*

(Continued)

*Primary Examiner* — A. Dexter Tugbang
(74) *Attorney, Agent, or Firm* — Morgan, Lewis & Bockius LLP

(57) ABSTRACT

A method for manufacturing a coil component includes: preparing a wound coil, a first jig and a second jig; disposing the wound coil on the first jig; and pressing the wound coil, wherein the pressing the wound coil includes bringing the first jig and the second jig into contact with each other by a first rotation of the first jig.

19 Claims, 12 Drawing Sheets

(51) Int. Cl.

| | |
|---|---|
| ***H01F 41/09*** | (2016.01) |
| *H01F 27/30* | (2006.01) |
| *H01F 41/02* | (2006.01) |
| *H01F 41/061* | (2016.01) |
| *H01F 41/082* | (2016.01) |

(52) U.S. Cl.

CPC ........ *H01F 41/0246* (2013.01); *H01F 41/061* (2016.01); *H01F 41/082* (2016.01); *Y10T 29/49073* (2015.01)

(56) References Cited

U.S. PATENT DOCUMENTS

| | | | | |
|---|---|---|---|---|
| 2017/0125166 | A1 | 5/2017 | Muneuchi et al. | |
| 2019/0221336 | A1 * | 7/2019 | Nishino ................ | H01F 41/082 |
| 2022/0013286 | A1 | 1/2022 | Busse et al. | |

FOREIGN PATENT DOCUMENTS

| | | | | |
|---|---|---|---|---|
| JP | 2019140880 | A * | 8/2019 | ........... H02K 15/105 |
| KR | 10-2017-0023620 | A | 3/2017 | |
| KR | 10-1854578 | B1 | 5/2018 | |
| KR | 10-2021-0124263 | A | 10/2021 | |

OTHER PUBLICATIONS

Office Action issued on Jun. 19, 2025 in corresponding Korean Patent Application No. 10-2021-0146407 with English translation.

* cited by examiner

METHOD FOR MANUFACTURING COIL COMPONENT

CROSS-REFERENCE TO RELATED APPLICATION(S)

This application claims the benefit of priority to Korean Patent Application No. 10-2021-0146407 filed on Oct. 29, 2021 in the Korean Intellectual Property Office, the disclosure of which is incorporated herein by reference in its entirety.

TECHNICAL FIELD

The present disclosure relates to a method for manufacturing a coil component.

BACKGROUND

There has been continuous demand for a wire-wound power inductor including a wound coil, which may implement higher efficiency characteristics in low-current and high-current environments. Accordingly, there is a trend to develop a power inductor implementing higher efficiency in low-current and high-current environments by having reduced direct current resistance (Rdc) and increased inductance (Ls). It is expected that continuous demand for improved efficiency characteristics of power conductors will be made in the future. Accordingly, there is a growing need to develop a method of implementing the power inductor achieving improved efficiency in the low-current and high-current environments by having reduced Rdc and increased Ls.

SUMMARY

An aspect of the present disclosure may provide a method for manufacturing a coil component, which may be used for manufacturing a coil component with easy mass production and excellent price competitiveness.

Another aspect of the present disclosure may provide a method for manufacturing a coil component, which may reduce a size of a coil component.

Another aspect of the present disclosure may provide a method for manufacturing a coil component, which may secure a cut margin of a coil component.

Another aspect of the present disclosure may provide a method for manufacturing a coil component, which may prevent a defective coil exposure of the coil component.

Another aspect of the present disclosure may provide a method for manufacturing a coil component, which may increase a volume of a magnetic material of a coil component.

According to an aspect of the present disclosure, a method for manufacturing a coil component may include: preparing a wound coil, a first jig and a second jig; disposing the wound coil on the first jig; and pressing the wound coil, wherein the pressing the wound coil includes bringing the first jig and the second jig into contact with each other by a first rotation of the first jig.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings.

Meanwhile, in the present disclosure, an X-direction refers to an L direction or a length direction, a Y-direction refers to a W direction or a width direction, and a Z-direction refers to a T direction or a thickness direction.

Method for Manufacturing Coil Component

Hereinafter, the description describes a method for manufacturing a coil component according to an exemplary embodiment of the present disclosure, and in particular, exemplarily describes a method for manufacturing a wound-type coil component, and the present disclosure is not necessarily limited thereto.

Input Process

Figure 1:
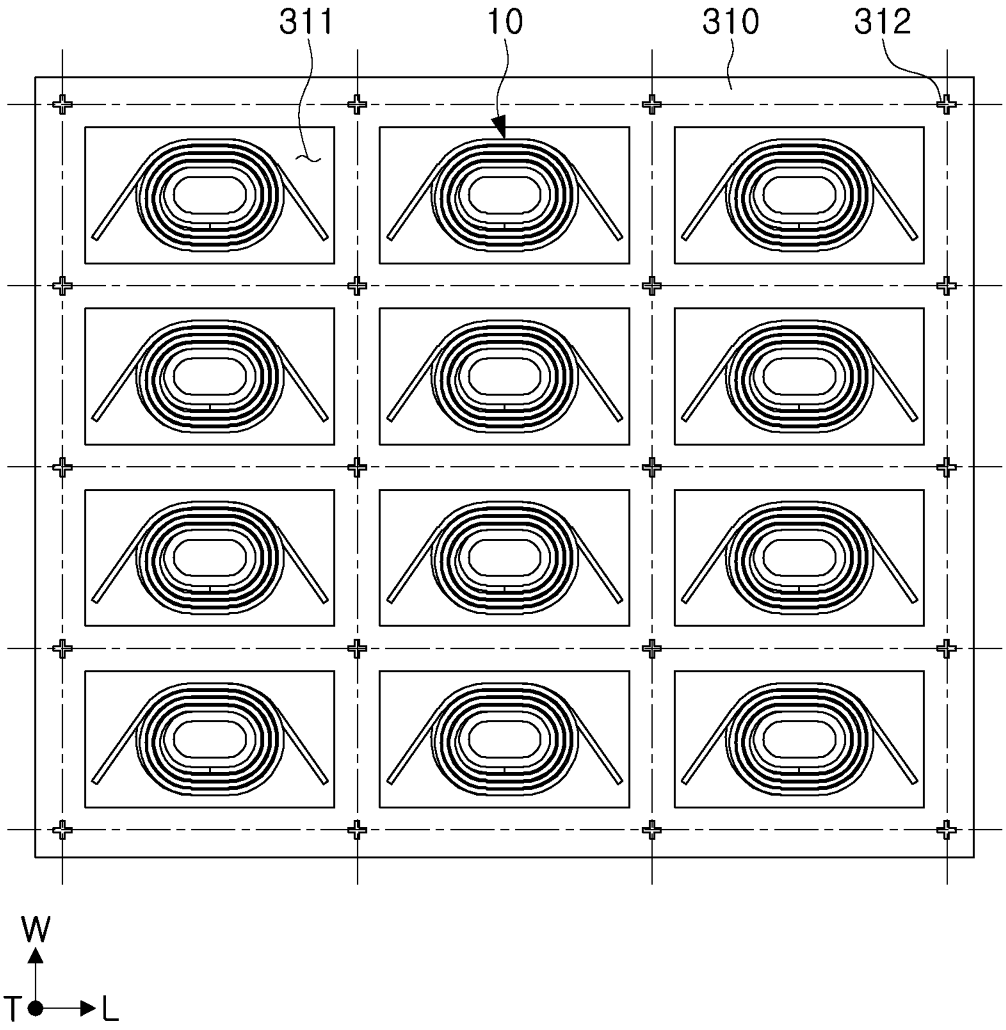
FIG. 1 is a cross-sectional view illustrating that wound coils are arranged on a tray.

FIG. 1 is a cross-sectional view illustrating that wound coils are arranged on a tray.

Figure 2:
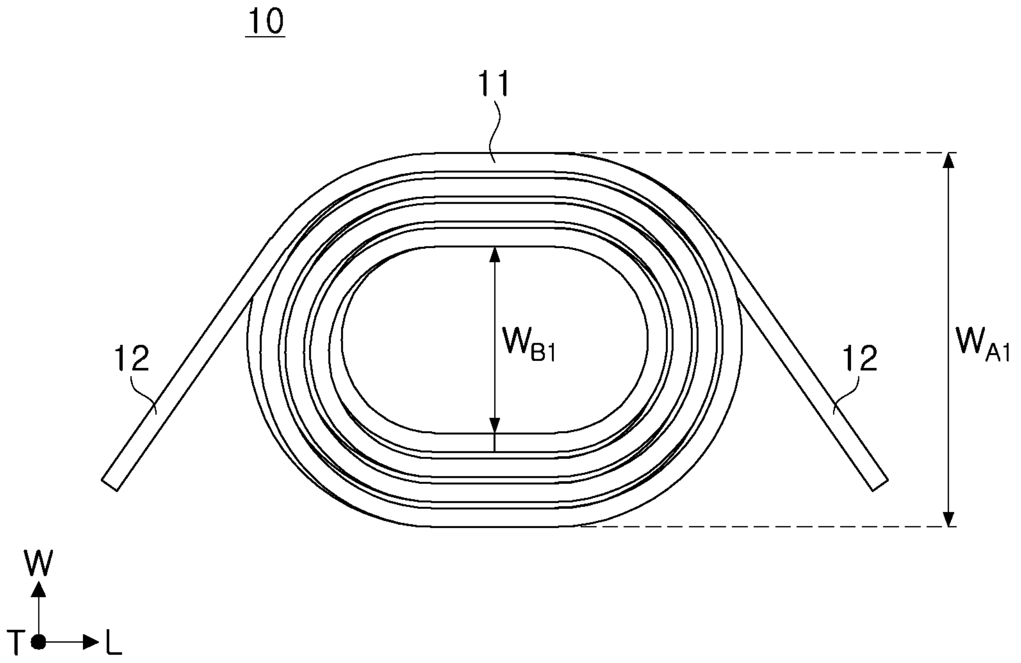
FIG. 2 is a cross-sectional view of a wound coil before being processed in processes of manufacturing a coil component according to an exemplary embodiment.

FIG. 2 is a cross-sectional view of a wound coil before being processed in processes of manufacturing a coil component according to an exemplary embodiment.

A method for manufacturing a coil component according to an exemplary embodiment may include: preparing a wound coil 10, a first jig 100A and a second jig 200; disposing the wound coil 10 on the first jig 100A; and pressing the wound coil 10, wherein the pressing the wound coil 10 includes bringing the first jig 100A and the second jig 200 into contact with each other by a first rotation of the first jig 100A.

In the preparing the wound coil 10, the wound coil 10 may be formed by a winding method, and may include a wound portion 11 and a lead-out portion 12. The wound coil 10 may include, for example, a metal wire such as copper (Cu) or silver (Ag), and is not necessarily limited thereto.

The wound coil 10 may not be limited to a single wire, and may include a stranded wire or two or more wires. In addition, the wound coil 10 may not be limited to having a circular cross-sectional shape, and may have any of various known cross-sectional shapes such as a square.

In addition, the wound coil 10 may be wound while having a plurality of layers, and may form at least one or more turns in each layer.

The wound coil 10 may include the wound portion 11 and a pair of lead-out portions 12 each led out from ends of the coil of the wound portion 11. In this case, the pair of lead-out portions 12 may be led out in opposite directions.

FIG. 1 is a cross-sectional view illustrating that the plurality of wound coils 10 are arranged on a tray 310. That is, the wound coils 10 may be prepared, and then be arranged in a plurality of recesses 311 formed in the tray 310, while having a plurality of rows and columns. An alignment mark 312 may be formed in the tray 310 to easily identify each of the plurality of recesses 311 and the wound coil 10 disposed in the recess 311.

Referring to FIG. 2, the wound coil 10 before deformation may have an outer diameter of $W_{A1}$ and an inner diameter of $W_{B1}$ in the width (W) direction. Here, the outer diameter may refer to a longest distance between two points of the wound coil 10 are connected to each other in the W direction defined as the width (W) direction.

In addition, the inner diameter may refer to a distance having a longest distance between two points of the innermost layer of the wound coil 10 are connected to each other in the width (W) direction.

Figure 3:
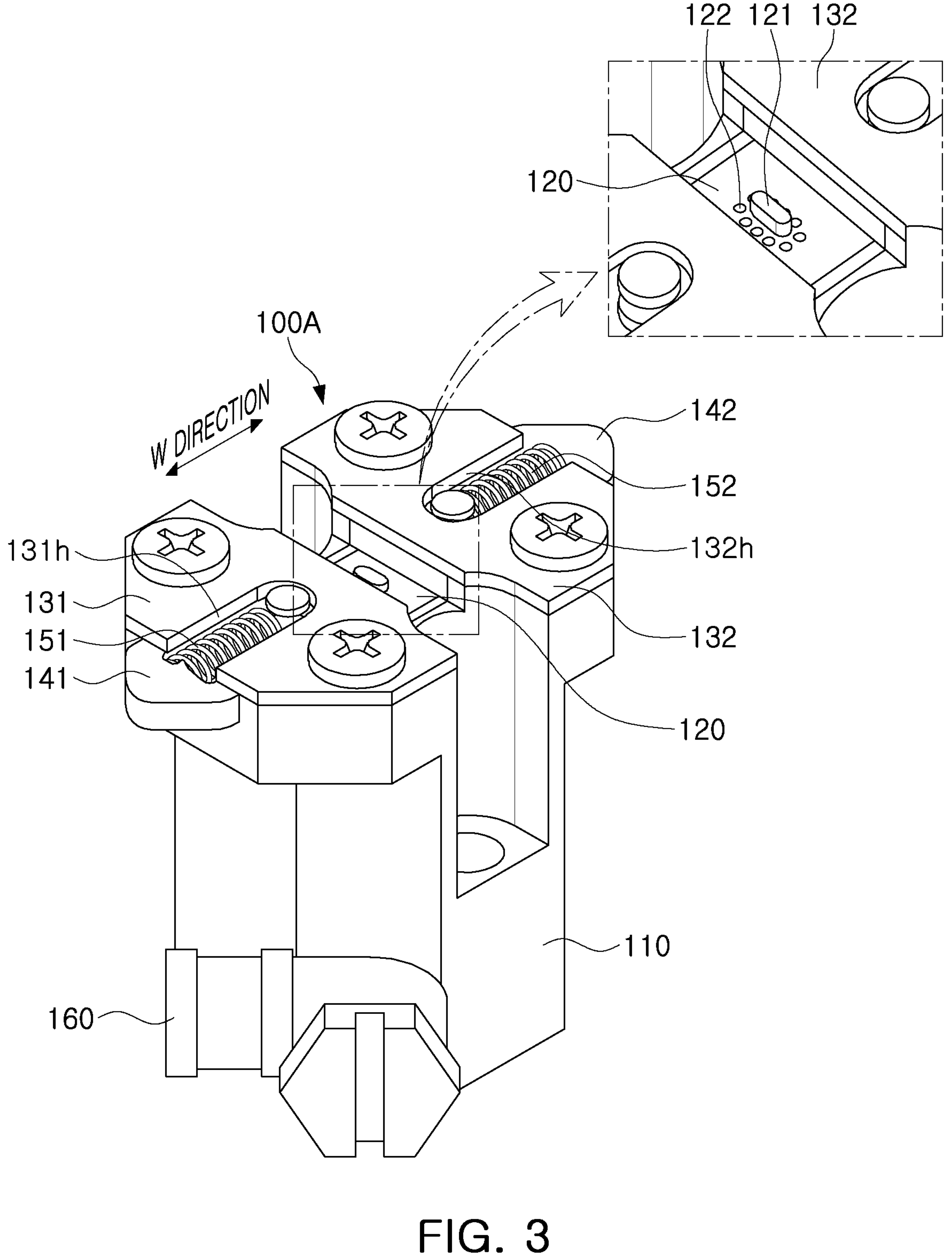
FIG. 3 is a perspective view of a portion of a coil alignment device used in the processes of manufacturing a coil component according to an exemplary embodiment.

FIG. 3 is a perspective view of a portion of a coil alignment device used in the processes of manufacturing a coil component according to an exemplary embodiment.

In the method for manufacturing a coil component according to an exemplary embodiment, the first and second jigs 100A and 200 may be prepared together with the wound coil 10. The coil alignment device in the present disclosure may include the first and second jigs 100A and 200.

FIG. 3 shows a configuration of the first jig 100A of the coil alignment device. The first jig 100A may include an operation portion 110, a support portion 120 disposed on the operation portion 110. First and second pressing portions 131 and 132 respectively connected to two opposite sides of the support portion 120 and opposing each other in the W direction. First and second contact portions 141 and 142 each attaches to the outer surface of each of the first and second pressing portions 131 and 132, which is opposite to the side that are connected to the support portion. First and second springs 151 and 152 respectively are disposed in grooves 131*h* and 132*h* formed in the first and second pressing portions 131 and 132, and the first and second springs 151 and 152 respectively connect the first and second pressing portions 131 and 132 and the first and second contact portions 141 and 142.

The following description describes each component in detail based on a sequence of the method for manufacturing a coil component using the wound coil 10 according to an exemplary embodiment of the present disclosure.

In the method for manufacturing a coil component according to an exemplary embodiment, the wound coil 10 may be disposed on the first jig 100A. In detail, the wound coil 10 disposed on the tray 310 (not illustrated) may be disposed on the support portion 120 of the first jig 100A by using a first robot arm (not illustrated).

Meanwhile, the support portion 120 may have a core pin 121 and a suction portion 122. The core pin 121 may have a shape such as a circular shape, an elliptical shape, or a rectangular shape to correspond to a core portion of the wound coil 10. FIG. 3 shows an elliptical core pin 121.

The suction portion 122 of the support portion 120 may be formed in one surface of the support portion 120 and formed in a region where the wound coil 10 is to be disposed along a circumference of the core pin 121. In the disposing the wound coil 10 on one surface of the support portion 120 of the first jig 100A, the suction portion 122 may be formed in the support portion 120 to prevent the wound coil 10 from being misaligned or falling off by impact. The suction portion 122 may be connected to an exhaust portion 160 of the first jig 100A to suck air away from the suction portion 122 toward the outside, thereby generating a vacuum state. Accordingly, the wound coil 10 disposed on one surface of the support portion 120 may be stably fixed during the pressing process.

Alignment Process

Figure 4:
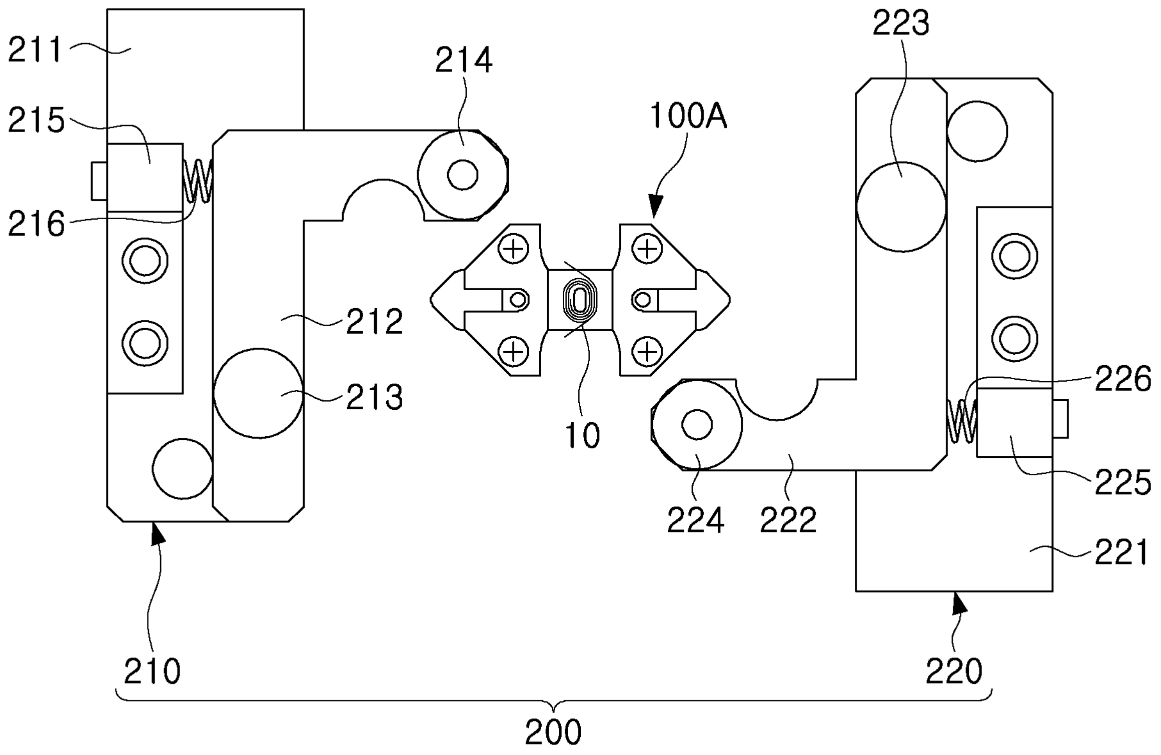
FIGS. 4 through 6 are process views sequentially illustrating some of the processes of manufacturing a coil component according to an exemplary embodiment.
Figure 5:
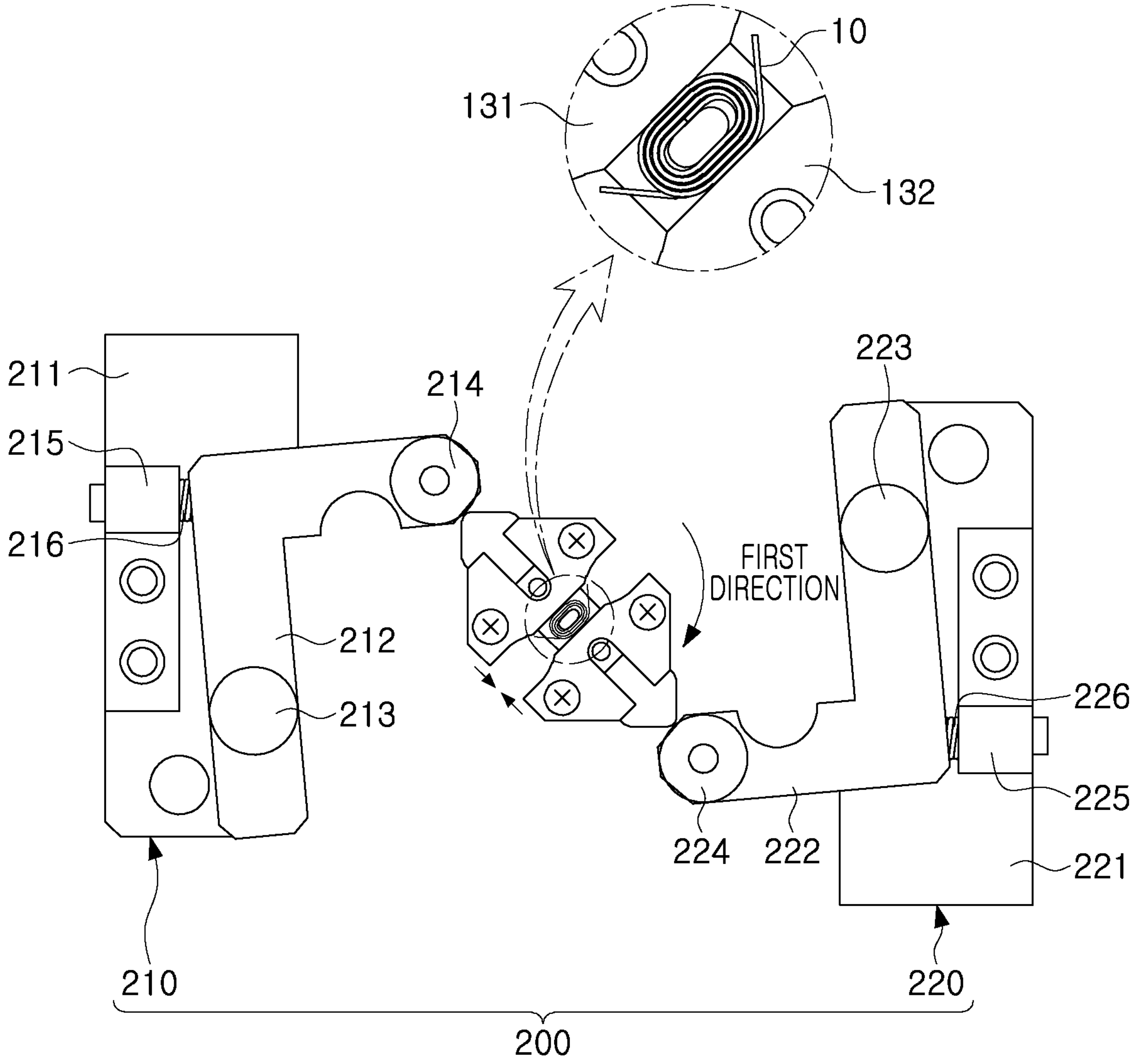
Figure 6:
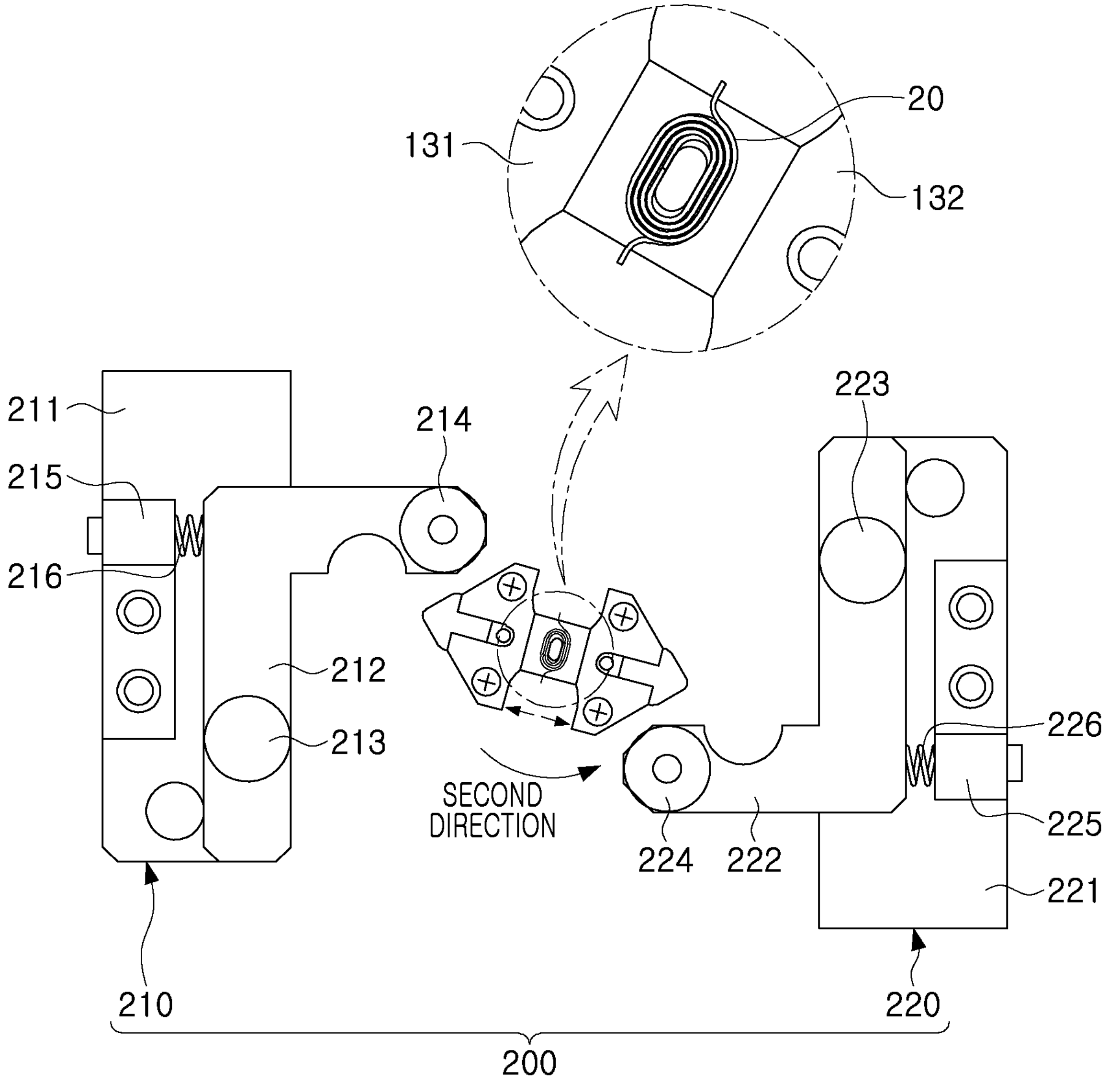

FIGS. 4 through 6 are process views sequentially illustrating some of the processes of manufacturing a coil component according to an exemplary embodiment.

Referring to FIG. 4, as described above, the wound coil 10 may be disposed on one surface of the support portion 120 of the first jig 100A, and may be fixed to the core pin 121 and the suction portion 122.

Meanwhile, the second jig 200 may be disposed on each of two sides of the first jig 100A. The second jig 200 may include a pair of a second-$1^{st}$ jig 210 and a second-$2^{nd}$ jig 220. The second-$1^{st}$ jig 210 may include a holder 211, a rotation portion 212, a fix portion 213, a bearing 214, a support portion 215 and a spring 216. In addition, the second-$2^{nd}$ jig 220 may include a holder 221, a rotation portion 222, a fix portion 223, a bearing 224, a support portion 225 and a spring 226.

Hereinafter, the description collectively describes each component of the second jig 200 including the second-$1^{st}$ and the second-$2^{nd}$ jigs 210 and 220.

The holder 211 or 221 may support the second jig 200, and the rotation portion 212 or 222 may be fixed to the holder 211 or 221 by using the fix portion 213 or 223. The rotation portion 212 or 222 may be rotated by a predetermined distance, based on the fix portion 213 or 223, and when the rotation portion 212 or 222 is rotated, pressure may be applied to the spring 216 or 226, and rotation of the rotation portion 212 or 222 may be suppressed by the support portion 215 or 225. The bearing 214 or 224 may be disposed at one end of the rotation portion 212 or 222. The bearing 214 or 224 may be one machine element reducing friction between moving portions, and may be a mechanical device supporting the rotational or reciprocating axis at a fixed position to freely move the moving portion. The bearing 214 or 224 in the present disclosure may correspond to a region where the first or second contact portion 141 or 142 is in contact with the second jig 200 in processes described below, and may reduce friction during their contacts, thereby preventing damage to a surface of the first or second contact portion 141 or 142. The bearing 214 or 224 may be one of a ball bearing, a roller bearing, a plain bearing, a fluid bearing, a magnetic bearing, a sleeve bearing and a covering bearing, and is not limited thereto.

FIG. 5 shows the pressing the wound coil 10. When the wound coil 10 is disposed on the support portion 120 of the first jig 100A, the first jig 100A may be rotated in a first direction by command and operation of the operation portion 110 including a power motor, and this rotation may be referred to as the first rotation. Here, the first jig 100A may be rotated in position, based on a central axis of the first jig 100A when viewed from above, and may be rotated in the first direction, a rotation direction of the first rotation. In an exemplary embodiment, the first direction may be a clockwise direction.

As illustrated in FIG. 5, the first jig 100A may be rotated in the first direction, and the first or second contact portion 141 or 142 of the first jig 100A may thus be in contact with the bearing 214 or 224 of the second jig 210 or 220.

The first or second contact portion 141 or 142 may be formed on the other surface of the first or second pressing portion 131 or 132, and have a triangular prism shape having a triangular cross section when viewed from above. The first or second contact portion 141 or 142 having the triangular prism shape may have a horizontal cross section formed in a triangular shape, and here, the triangular shape, a shape of the horizontal cross section of each of the first and second contact portions 141 and 142, may be the triangular shape symmetrical in the W direction. The first and second contact portions 141 and 142 may respectively be connected to the first and second pressing portions 131 and 132, and may respectively be attached to or integrally formed with the other surface of each of the first and second pressing portions 131 and 132.

The first and second pressing portions 131 and 132 may be disposed on the support portion 120 of the first jig 100A so that one surface of the first pressing portion 131 and one surface of the second pressing portion 132 oppose each other in the W direction, and may be designed to be moved in the W direction. Meanwhile, the movement of the first or second pressing portion 131 or 132 may be controlled by the first or second spring 151 or 152 disposed in the first or second groove 131*h* or 132*h* such that the first and second pressing portions 131 and 132 may be kept as far as possible from each other by elasticity of the first and second springs 151 and 152 before the first rotation of the first jig 100A.

When the first or second contact portion 141 or 142 comes into contact with the bearing 214 or 224 by the rotation of the first jig 100A, pressure may be applied to the first or second contact portion 141 or 142. Accordingly, the first or second pressing portion 131 or 132 connected to the first or second contact portion 141 or 142 may be moved toward the core pin 121 of the support portion 120. When the first rotation is continued, the first and second pressing portions 131 and 132 may be moved to bring the inner surface of each of the first and second pressing portions 131 and 132 into contact with the wound portion 11 of the wound coil 10 fixed to the core pin 121, and as a result, pressure may be applied from the outside of the wound portion 11 of the wound coil 10. Here, the width (W) direction, the direction in which one surface of the first pressing portion 131 and one surface of the second pressing portion 132 oppose each other, may be the width (W) direction of the wound coil 10.

Here, the first or second contact portion 141 or 142 and the first or second pressing portion 131 or 132 may be connected to each other, and the first or second spring 151 or 152 disposed in the first or second groove 131*h* or 132*h* may use the elasticity to apply force in an opposite direction to the direction in which the first or second contact portion 141 or 142 is moved toward the wound coil 10 or the core pin 121. Therefore, when the first jig 100A is rotated to a maximum angle by the first rotation, the first or second pressing portion 131 or 132 may maintain a shortest distance with the core pin 121, while being in contact with the wound coil 10, and the first or second spring 151 or 152 may here be in a maximum retraction.

As a result, pressure applied to the first or second contact portion 141 or 142 by the first rotation of the first jig 100A may be transmitted to the first or second pressing portion 131 or 132, the first or second pressing portion 131 or 132 may thus be moved toward the wound coil 10. Accordingly, the wound coil 10 may receive pressure again in the width (W) direction, and thus have a deformed shape. The deformed shape of the wound coil 10 by pressure applied in the width (W) direction is described below.

An enlarged view of FIG. 5 shows that one surface of the first or second pressing portion 131 or 132 is in contact with the wound coil 10 by the first rotation of the first jig 100A, and the wound coil 10 is pressed by the first or second pressing portion 131 or 132 and the core pin 121 to have the deformed shape.

Meanwhile, when the first or second contact portion 141 or 142 comes into contact with the bearing 214 or 224 by the rotation of the first jig 100A, the bearing 214 or 224 may also be under pressure. The bearing 214 or 224 may be disposed at one end of the rotation portion 212 or 222 of the second-1-th jig 210 or the second-2-th jig 220, and the rotation portion 212 or 222 may be rotated based on the fix portion 213 or 223.

That is, when the bearing 214 receives pressure from the first contact portion 141 by the first rotation of the first jig 100A, the rotation portion 212 of the second-1$^{st}$ jig 210 may receive counterclockwise pressure, and thus be rotated counterclockwise based on the fix portion 213. Pressure may be applied to the support portion 215 by the rotation of the rotation portion 212, and this pressure may be relieved by the spring 216 disposed between the rotation portion 212 and the support portion 215. Here, the rotation of the rotation portion 212 may be limited only by the predetermined distance by the support portion 215.

Similarly, when the bearing 224 receives pressure from the second contact portion 142 by the first rotation of the first jig 100A, the rotation portion 222 of the second-2$^{nd}$ jig 220 may receive counterclockwise pressure, and thus be rotated counterclockwise based on the fix portion 223. Pressure may be applied to the support portion 225 by the rotation of the rotation portion 222, and this pressure may be relieved by the spring 226 disposed between the rotation portion 222 and the support portion 225. Here, the rotation of the rotation portion 222 may be limited only by the predetermined distance by the support portion 225.

As a result, the rotation portion 212 or 222 of the second-1$^{st}$ jig 210 or the second-2$^{nd}$ jig 220 may be rotated by the first rotation of the first jig 100A, thereby causing the bearing 214 of the second-1$^{st}$ jig 210 and the bearing 224 of the second-2$^{nd}$ jig 220 to be temporarily moved away from each other.

Referring to FIG. 6, the wound coil 10 before deformation may be pressed to a desired strength and pressure, and the first jig 100A may then perform a second rotation by the command and operation of the operation portion 110 of the first jig 100A again. The second rotation may be performed in a second direction opposite to the first direction, based on a center of the support portion 120 as a rotation axis. In an exemplary embodiment, the second direction may be a counterclockwise direction.

Pressure between the first or second contact portion 141 or 142 and the bearing 214 or 224 may be reduced by the second rotation of the first jig 100A illustrated in FIG. 6.

Accordingly, pressure applied to the first or second pressing portion 131 or 132 by the first or second contact portion 141 or 142 may also be reduced, thereby also reducing pressure applied to the wound coil 10 by the first or second pressing portion 131 or 132. In this case, the elasticity of the first or second spring 151 or 152 which may return the spring retracted to the maximum to its original state before the retraction may be applied to the first or second contact portion 141 or 142 and the first or second pressing portion 131 or 132. Accordingly, one surface of the first pressing portion 131 and one surface of the second pressing portion 132 may thus be moved away from each other again in the W direction.

The first and second pressing portions 131 and 132 may be moved away from each other by the second rotation of FIG. 6, thereby completing a shape of a deformed wound coil 20 described below with reference to FIG. 7.

In addition, the bearings 214 and 224, temporarily moved away from each other by the first rotation, may also be close to each other again by the second rotation of the first jig 100A illustrated in FIG. 6 and return to the original states. When the first rotation is performed to the maximum angle, the rotation portion 212 or 222 may also be rotated to the maximum angle, and the spring 216 or 226 may also be in the maximum retraction. When the second rotation is performed as illustrated in FIG. 6, pressure applied to the spring 216 or 226 may be reduced, and the elasticity of the spring 216 or 226 applied to the rotation portion 212 or 222 may be greater than pressure applied to the rotation portion 212 or 212 from the first jig 100A, thereby rotating the rotation portion 212 or 222 to its original state. Therefore, the bearings 214 and 224, temporarily moved away from each other may be close to each other again in their original states.

The enlarged view of FIG. 6 shows the direction in which one surface of the first pressing portion 131 and one surface of the second pressing portion 132 are moved away from the wound coil 20 again by the second rotation of the first jig 100A.

Figure 7:
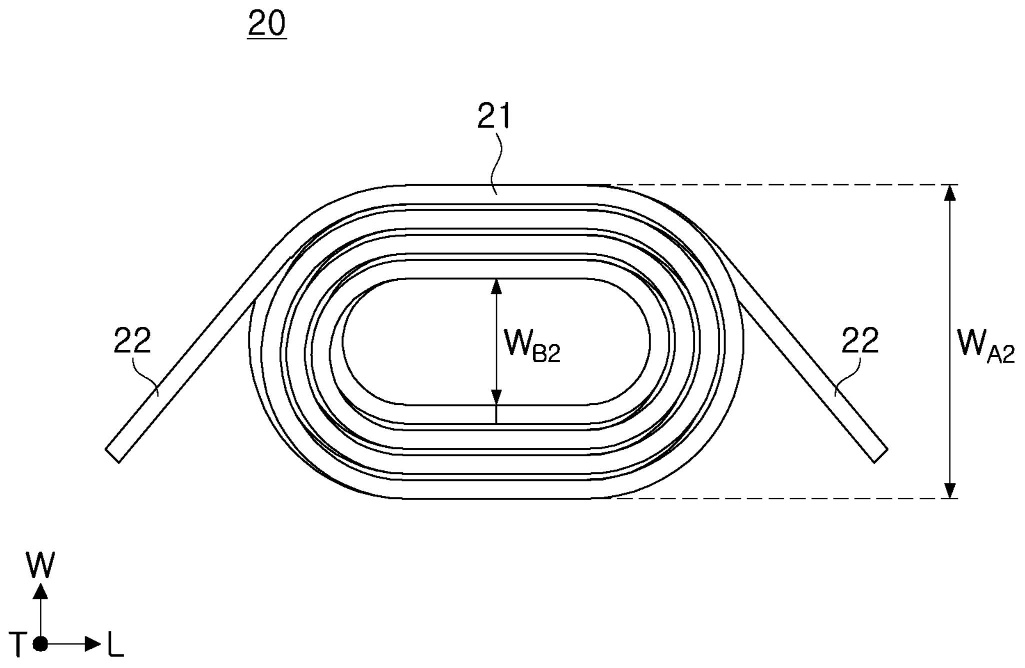
FIG. 7 is a cross-sectional view illustrating a wound coil manufactured by the processes of manufacturing a coil component according to an exemplary embodiment.

FIG. 7 is a cross-sectional view illustrating a wound coil manufactured by the processes of manufacturing a coil component according to an exemplary embodiment.

The wound coil 20 of FIG. 7 may be manufactured by the series of manufacturing processes of FIGS. 4 through 6 described above.

The deformed wound coil 20 of FIG. 7 may have the shape having the outer diameter of $W_{A2}$ and the inner diameter of $W_{B2}$, deformed by pressure applied in the width (W) direction, to the wound coil 10 before the deformation illustrated in FIG. 2. That is, $W_{A1}$, the outer diameter of the wound coil 10 before the deformation illustrated in FIG. 2 in the width (W) direction, may be reduced, and the outer diameter $W_{A2}$ of the deformed wound coil 20 in the width (W) direction may thus be smaller than $W_{A1}$.

In addition, $W_{B1}$, the inner diameter of the wound coil 10 before the deformation illustrated in FIG. 2 in the width (W) direction, may be reduced after deformation, and the inner diameter $W_{B2}$ of the deformed wound coil 20 in the width (W) direction may thus be smaller than $W_{B1}$.

As such, the outer and inner diameters of the wound coil 10 may be effectively reduced, and the wound coil 20 may easily have a reduced overall size by using the manufacturing method of FIGS. 4 through 6 according to an exemplary embodiment.

In a case of a conventional coil before the deformation, a width of an outermost turn of a wound coil 10 may be reduced by tensile stress of a wound portion 11 due to a radius of curvature of the wound coil 10, and here, a spring back phenomenon may occur in which a width of an innermost turn of the wound coil 10 returns to its original state by compression stress. Due to this phenomenon, a shape of the finally-wound wound coil 10 may not have a size designed by a simulation, and wound in a larger shape than a target shape.

In the case of the wound coil 20 of FIG. 7 pressed and deformed by using a method for manufacturing a coil component according to an exemplary embodiment of the present disclosure, it is possible to effectively suppress an increase in the size of the wound coil 20 in response to the above-described tensile stress/compression stress. In addition, the outer diameter of the wound coil 20 may have the reduced size in the width (W) direction. Accordingly, when the wound coil 20 has an inductor structure in the future, a margin of the body in the width (W) direction may be secured to increase capacity of a magnetic material in the body while preventing a defective exposure, thereby increasing its inductance.

Production Process

Figure 8:
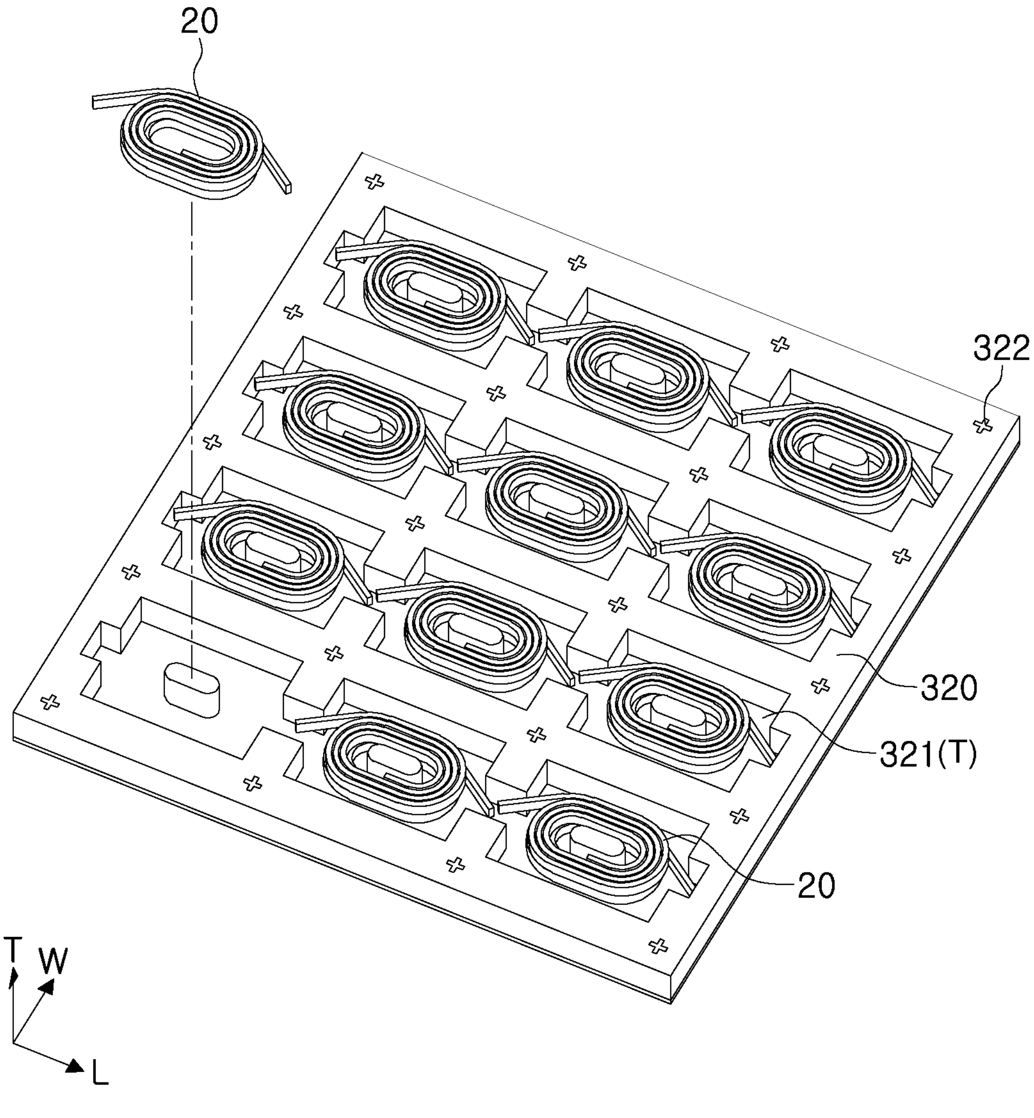
FIGS. 8 through 10 are process views sequentially illustrating the remainder of the processes of manufacturing a coil component according to an exemplary embodiment.
Figure 9:
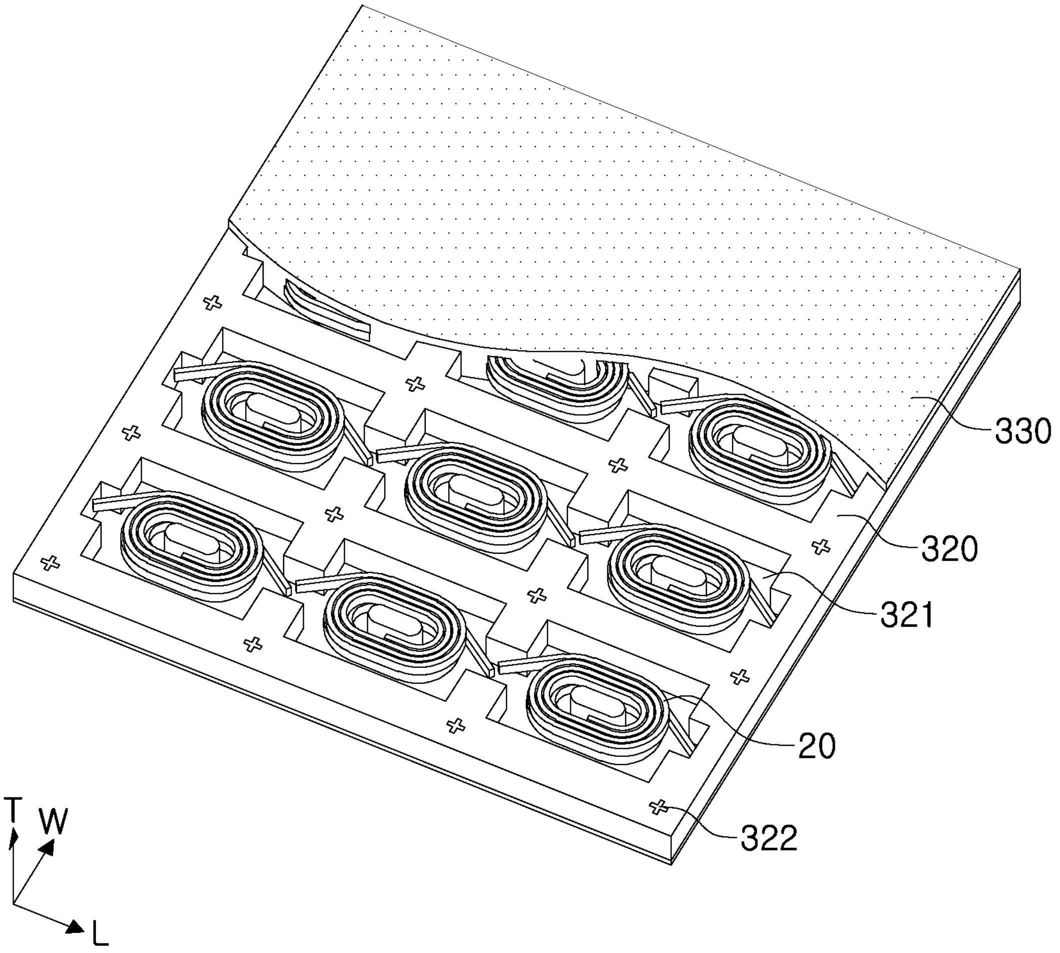
Figure 10:
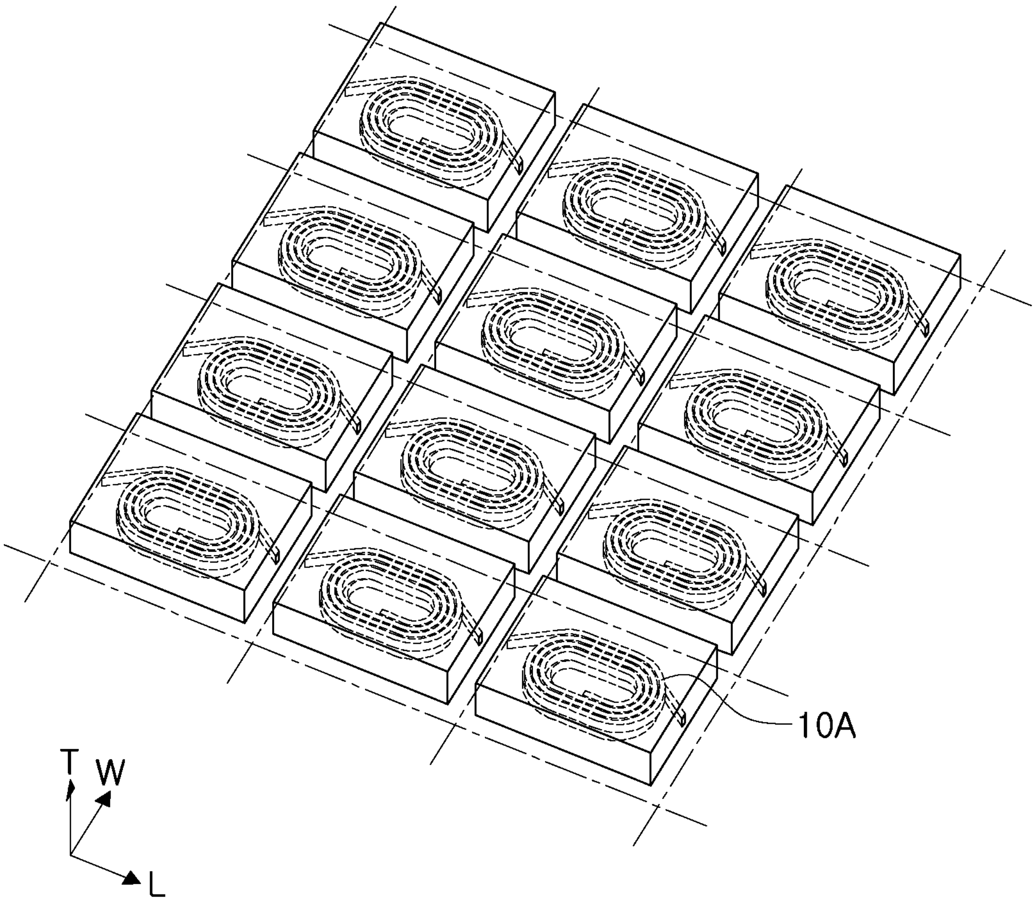

FIGS. 8 through 10 are process views sequentially illustrating the remainder of the processes of manufacturing a coil component according to an exemplary embodiment.

FIG. 8 shows a process in which the deformed wound coil 20 of FIG. 7 is disposed in a recess 321 of a frame 320 by a second robot arm (not illustrated).

The frame 320 may form a portion of an appearance of a wound coil assembly 10-1 in which the plurality of wound coils 20 are disposed. The frame 320 may include magnetic powder particles, and may be made of the magnetic powder particles and a thermosetting resin such as epoxy or polyimide interposed between the magnetic powder particles.

As a specific example, the magnetic powder particles may be ferrite or metal magnetic powder particles exhibiting a magnetic characteristic. In addition, the ferrite powder particles may include, at least one selected from the group consisting of Mn—Zn-based ferrite powder particles, Ni—Zn-based ferrite powder particles, Ni—Zn—Cu-based ferrite powder particles, Mn—Mg-based ferrite powder particles, Ba-based ferrite powder particles and Li-based ferrite powder particles, and the metal magnetic powder particles may include at least one selected from the group consisting of iron (Fe), silicon (Si), chromium (Cr), aluminum (Al), niobium (Nb), phosphorus (P), boron (B), carbon (C), cobalt (Co) and nickel (Ni). However, the present disclosure is not limited thereto.

Referring to FIG. 8, the frame 320 may have the plurality of recesses 321 open upward, and the deformed wound coil 20 may be disposed in each of the plurality of recesses 321. In addition, an alignment mark 322 may be formed to easily identify each of the plurality of recesses 321 and the wound coil 20 disposed in the recess 321. As described above, the wound coil 20 may be disposed on the frame 320 having the plurality of recesses 321 each open upwardly. Accordingly, compared to a conventional molding method in which a wound coil is disposed on a mold, a sealing material is then filled and then cured, it is possible to significantly reduce a cost of replacing a mold, and thus be advantageous in not only excellent price competitiveness but also easy mass production.

The plurality of recesses 321 may be regularly arranged based on a plane of the frame 320, in the W direction and the L direction inclined by 90 degrees from the W direction. In this case, a dicing key may be engraved on a boundary line between the plurality of recesses 321. It may thus significantly improve positional accuracy of the coil, thus making the mass production easy.

The recess 321 may have a size large enough compared to the size of the wound coil 10 to accommodate the wound coil 20. A region of the recess 321, around the wound coil 20, may be filled with a magnetic sheet 330 described below.

The recess 321 may not be particularly limited to a planar shape, and for example, may have a polygonal shape such as a square shape or may have a protrusion passing through a core of the wound coil 20. However, the recess 321 is not limited thereto, and may be variously modified to have another shape. In addition, it is possible to also form a space accommodating at least a portion of a lead-out portion 22 of the wound coil 20 as well as the wound coil 20.

The wound coil 20 may be disposed in each of the plurality of recesses 321, and interposed between the frame 320 and the magnetic sheet 330 so that at least a portion thereof is embedded therein.

Referring to FIG. 9, the magnetic sheet 330 may be formed on an upper surface of the frame 320.

The magnetic sheet 330 may form a portion of the appearance of the wound coil assembly 10-1 together with the frame 320.

Like the frame 320, the magnetic sheet 330 may include the magnetic powder particles, and may be made of the magnetic powder particles and the thermosetting resin such as epoxy or polyimide interposed between the magnetic powder particles.

Referring to FIG. 9, the magnetic sheet 330 obtained by molding a magnetic powder-resin composite into a sheet shape may be pressed and cured on the frame 320. The magnetic sheet 330 may cover the upper surface of the frame 320 and fill the recess 321 around the wound coil 20. In this case, a filling rate of the magnetic material may be increased, thereby further improving performance of a coil component.

The frame 320 and the magnetic sheet 330 may be made of the same material, or may be made of different materials. In the present disclosure, the frame 320 and the magnetic sheet 330 forming a space including a magnetic path may be separately formed, and it is thus possible to easily use two types of magnetic materials, and easily implement a desired product characteristic.

The present disclosure does not particularly limit a specific method of forming the magnetic sheet on the upper surface of the magnetic mold. For example, the magnetic sheet obtained by forming the magnetic powder-resin composite in the sheet shape may be stacked on the upper surface of the frame 320, and then heated and pressed to be cured at a temperature equal to or higher than a temperature in which the resin is cured. Here, the region of the recess 321, around the wound coil 20, may be filled with the magnetic sheet by pressure applied thereto.

Meanwhile, as described above, FIGS. 8 and 9 illustrate that the recess 321 of the frame 320 does not completely pass through the frame 320 and is open upward. However, the method for manufacturing a coil component of the present disclosure is not limited thereto, and may use a frame completely passed through by the recess 321 and open both upward and downward. In this case, the wound coil 20 may be fixed in the recess 321 by using a tape T, the magnetic sheet 330 may be pressed on the upper surface of the frame 320, the tape T may then be peeled off, and the magnetic sheet 330 may be additionally pressed on a lower surface of the frame 320 again. In this manner, the magnetic sheet 330 may be pressed on both the upper and lower surfaces of the frame 320, and then be cured to manufacture the coil component.

Next, referring to FIG. 10, a body 10A of the coil component may be manufactured by dicing the frame 320 and the magnetic sheet 330 along the boundary between the plurality of processed spaces. Here, it is possible to dice the frame 320 and the magnetic sheet 330 into individual coil components by using a dicing facility, or by using another cutting method such as a blade or a laser.

An external electrode (not illustrated) may be formed on the outside of the body 10A, and an insulating layer preventing a short circuit between the external electrodes may be formed, thereby completing the coil component. In an exemplary embodiment, the external electrode may be disposed on each of two opposite surfaces of the body 10A in the length (L) direction perpendicular to the width (W) direction of the wound coil 20. The external electrode disposed on a surface of the body 10A may be electrically connected to the wound coil 20 embedded in the body. The external electrode may be disposed on each of the two opposite surfaces of the body 10A. However, this disposition is only an example, and the disposition of the external electrode may be variously modified based on the type, design and process need of the coil component.

The external electrode may include a metal such as silver (Ag), silver-palladium (Ag—Pd), nickel (Ni), copper (Cu) or an alloy thereof, and a nickel (Ni) plating layer and a tin (Sn) plating layer may be selectively formed on a surface of the external electrode.

Figure 11:
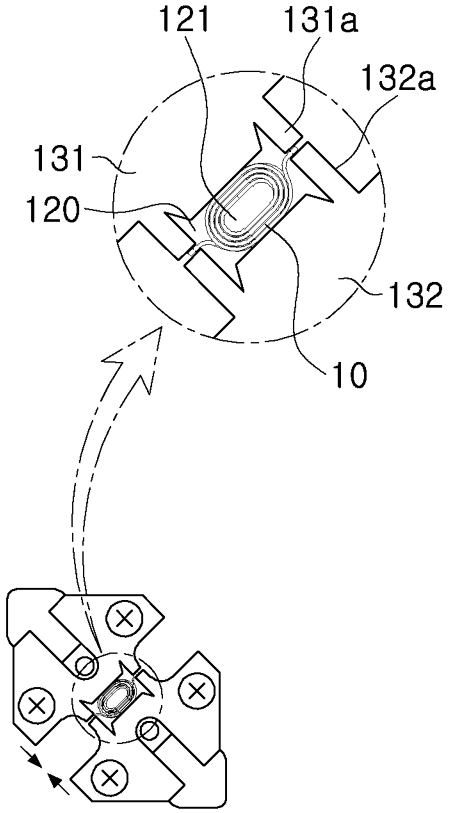
FIG. 11 is a top plan view of a portion of a coil alignment device used in processes of manufacturing a coil component according to another exemplary embodiment.

FIG. 11 is a top plan view of a portion of a coil alignment device used in processes of manufacturing a coil component according to another exemplary embodiment.

FIG. 11 shows a first jig 100B of the coil alignment device used in the processes of manufacturing a coil component according to another exemplary embodiment.

The first jig 100B of the coil component used in the processes of manufacturing a coil component according to another exemplary embodiment may be different from the first jig 100A of the coil component used in the processes of manufacturing a coil component according to an exemplary embodiment in that the first and second pressing portions 131 and 132 respectively include first and second protrusions 131*a* and 132*a*. Accordingly, the description of the processes of manufacturing a coil component according to an exemplary embodiment and the coil alignment device used therein may be equally applied to the rest overlapping components.

Referring to FIG. 11, the first jig 100B used in the processes of manufacturing a coil component according to another exemplary embodiment may include the first or second protrusion 131*a* or 132*a* protruding from each of two ends of the first or second pressing portion 131 or 132.

The first protrusion 131*a* may be formed at each of the two ends of the first pressing portion 131, in a direction perpendicular to the above-described W direction, and the second protrusion 132*a* may be formed at each of the two ends of the second pressing portion 132 in the direction perpendicular to the above-described W direction. Here, the first and second protrusions 131*a* and 132*a* may oppose each other in the W direction, the direction in which the first and second pressing portions 131 and 132 oppose each other.

It is possible not only press the wound portion 11 of the wound coil 10 but also press the lead-out portion 12 of the wound coil 10 when the first and second pressing portions 131 and 132 respectively include the first and second protrusions 131*a* and 132*a*. That is, both surfaces of the first and second protrusions 131*a* and 132*a*, opposing each other, may press the lead-out portion 12, thereby deforming a shape of the lead-out portion 12 as well as that of the wound portion 11.

Figure 12:
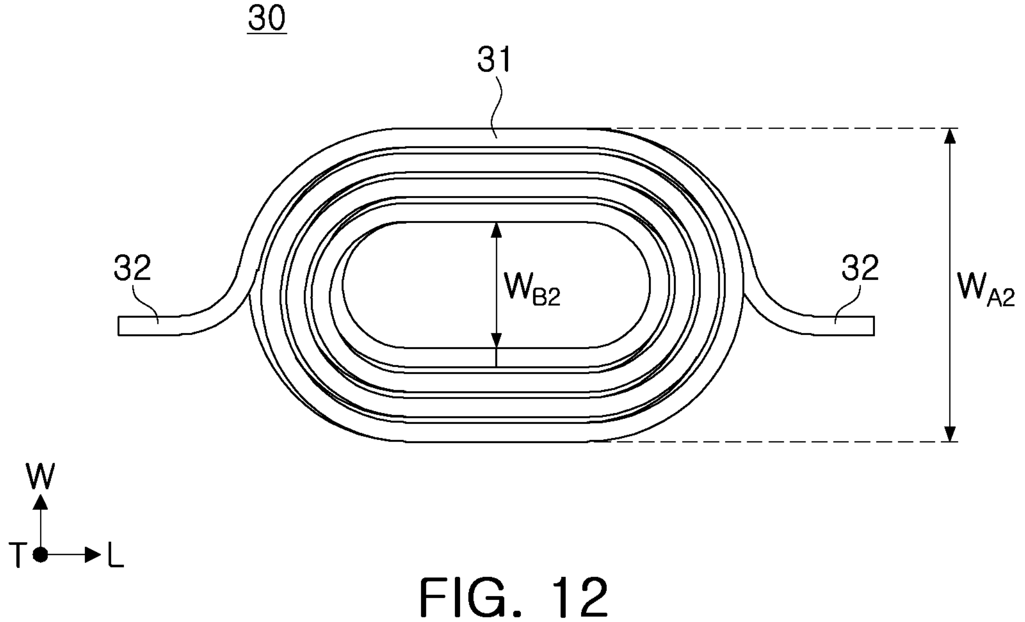
FIG. 12 is a cross-sectional view illustrating a wound coil manufactured by processes of manufacturing a coil component according to yet another exemplary embodiment.
Figure 13:
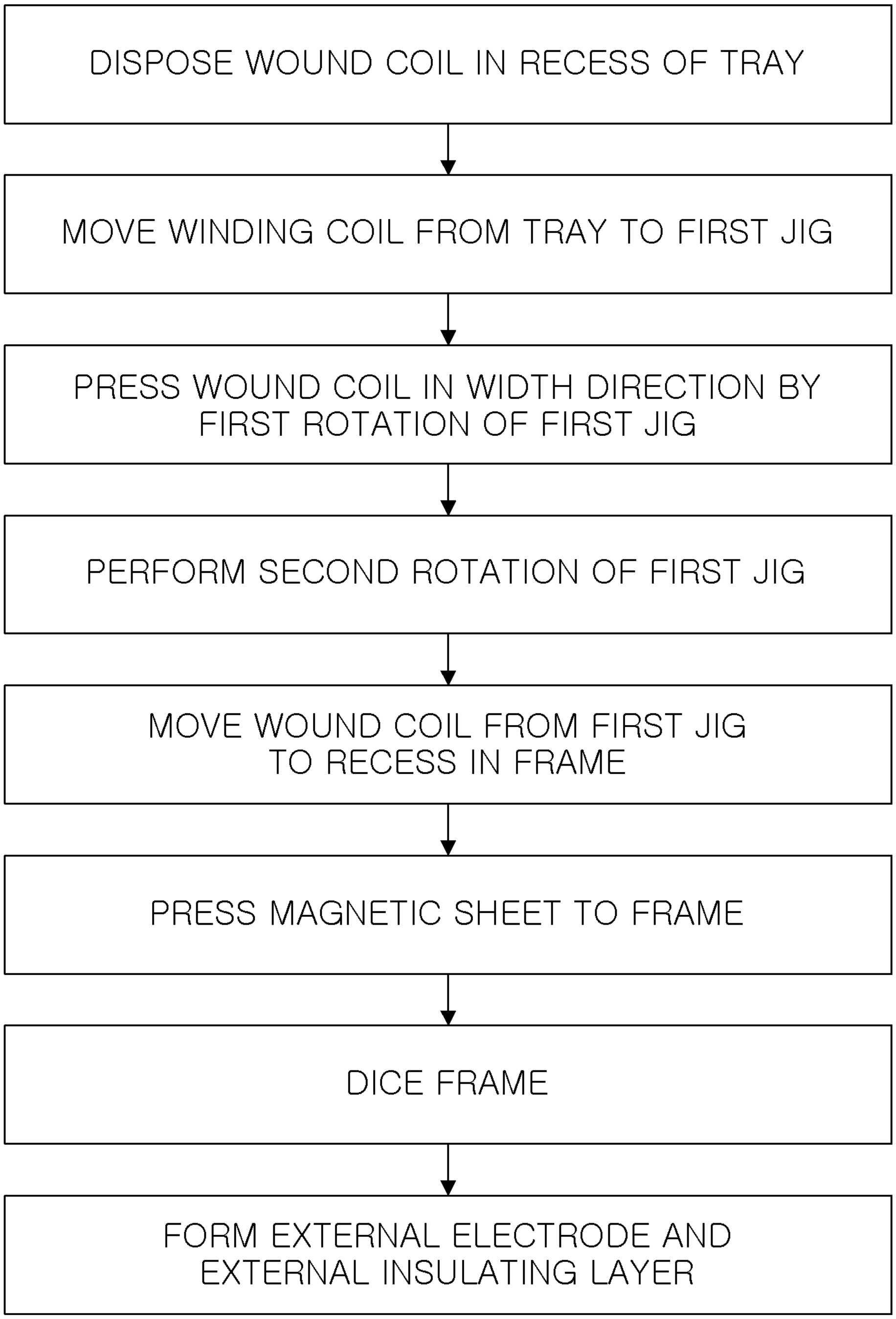
FIG. 13 is a flowchart illustrating a method for manufacturing a coil component according to an exemplary embodiment.

FIG. 12 is a cross-sectional view illustrating a wound coil manufactured by processes of manufacturing a coil component according to yet another exemplary embodiment.

Referring to FIG. 12, a deformed wound coil 30 may have a lead-out portion 32 whose shape is different from that of the lead-out portion of the deformed wound coil 20 of FIG. 7. That is, the deformed wound coil 30 may have the lead-out portion 32 bent in the length (L) direction perpendicular to the width (W) direction.

Accordingly, the lead-out portion 32 may be easily exposed to each of cross-sections of the later-completed coil component, opposing each other, in the length (L) direction of the body, thereby preventing the defective exposure of the lead-out portion 32.

As set forth above, according to the present disclosure, it is possible to provide the method for manufacturing a coil component, which may be used for manufacturing the coil component with easy mass production and excellent price competitiveness.

According to the present disclosure, it is possible to provide the method for manufacturing a coil component, which may reduce the size of the coil component.

According to the present disclosure, it is possible to provide the method for manufacturing a coil component, which may secure the cut margin of the coil component.

According to the present disclosure, it is possible to provide the method for manufacturing a coil component, which may prevent the defective coil exposure of the coil component.

According to the present disclosure, it is possible to provide the method for manufacturing a coil component, which may increase the volume of the magnetic material of the coil component.

While exemplary embodiments have been shown and described above, it will be apparent to those skilled in the art that modifications and variations could be made without departing from the scope of the present disclosure as defined by the appended claims.

What is claimed is:

1. A method for manufacturing a coil component, comprising:

preparing a wound coil, a first jig and a second jig;

disposing an entirety of the wound coil on the first jig; and pressing the wound coil by bringing the first jig and the second jig into contact with each other through a first rotation of the first jig, wherein the first jig includes a support portion, a core pin formed on the support portion, and first and second pressing portions each having an inner surface, the inner surfaces of the first and second pressing portions of the first jig are opposing each other, while having the core pin interposed in-between the inner surfaces, and the entirety of the wound coil is wound around along an outer surface of the core pin and disposed between the first pressing portion and the second pressing portion on the support portion and fixed to the core pin.

2. The method of claim 1, wherein the wound coil includes a wound portion and a lead-out portion, and in the pressing the wound coil, the first and second pressing portions move toward the core pin to bring the inner surface of each of the first and second pressing portions into contact with the wound portion, thereby pressing the wound coil in a width direction.

3. The method of claim 2, further comprising moving the first jig and the second jig away from each other by a second rotation of the first jig after the pressing the wound coil.

4. The method of claim 3, wherein the first rotation of the first jig is performed in a first direction, based on a central axis of the first jig, and the second rotation of the first jig is performed in a second direction opposite to the first direction, based on the central axis of the first jig.

5. The method of claim 4, wherein the first direction is a clockwise direction, and the second direction is a counterclockwise direction.

6. The method of claim 4, wherein the first jig further includes first and second contact portions each connected to an outer surface of each of the first and second pressing portions, and in the bringing the first jig and the second jig into contact with each other by the first rotation of the first jig, the first and second contact portions are in contact with the second jig.

7. The method of claim 6, wherein the second jig includes a holder, a rotation portion disposed on the holder, and a bearing disposed on the rotation portion, and in the bringing the first jig and the second jig into contact with each other by the first rotation of the first jig, the first and second contact portions are in contact with the bearing of the second jig.

8. The method of claim 7, wherein the second jig further includes a fix portion fixing the rotation portion to the holder, and in the bringing the first jig and the second jig into contact with each other by the first rotation of the first jig, the rotation portion is rotated counterclockwise based on the fix portion.

9. The method of claim 8, wherein in the bringing the first jig and the second jig into contact with each other by the second rotation of the first jig, the rotation portion is rotated clockwise based on the fix portion.

10. The method of claim 9, wherein first and second grooves are respectively formed in the first and second pressing portions, the first jig includes first and second springs respectively disposed in the first and second grooves, and the first and second springs are retracted when the first jig performs the first rotation.

11. The method of claim 10, wherein in the moving the first jig and the second jig away from each other by the second rotation of the first jig, the retracted first and second springs are relaxed to move the first and second pressing portions away from the wound coil.

12. The method of claim 3, wherein the first and second pressing portions each includes a protrusion, and in the pressing the wound coil, the first and second pressing portions are moved for the protrusion of each of the first and second pressing portions to be in contact with the lead-out portion, thereby pressing the wound coil.

13. The method of claim 3, further comprising:

disposing the wound coil in a recess of a tray before the disposing of the entirety of the wound coil on the first jig, and disposing the wound coil in a recess of a frame after the moving of the first jig and the second jig away from each other by the second rotation of the first jig.

14. The method of claim 13, further comprising stacking a magnetic sheet on one surface and another surface of the frame.

15. The method of claim 14, further comprising dicing the frame and the magnetic sheet.

16. The method of claim 1, wherein the support portion further includes a suction portion to prevent the wound coil from being misaligned or falling off by impact.

17. The method of claim 16, wherein the suction portion is connected to an exhaust portion of the first jig to suck air away from the suction portion toward the outside, thereby generating a vacuum state.

18. The method of claim 1, wherein the coil wound after the pressing the wound coil has an outer diameter ($W_{A2}$) and an inner diameter ($W_{B2}$) each smaller than an outer diameter ($W_{A1}$) and an inner diameter ($W_{B1}$) of the wound coil before the pressing the wound coil.

19. A method for manufacturing a coil component, comprising:

preparing a wound coil, a first jig and a second jig;

disposing an entire part of the wound coil on the first jig;

pressing the wound coil by bringing the first jig and the second jig into contact with each other through a first rotation of the first jig; and moving the first jig and the second jig away from each other by a second rotation of the first jig after the pressing the wound coil;

wherein the first jig includes a support portion, a core pin formed on the support portion, and first and second pressing portions each having an inner surface, the inner surfaces of first and second pressing portions are opposing each other, while having the core pin interposed in-between the inner surfaces, and the entire part of the wound coil is disposed between the first pressing portion and the second pressing portion on the support portion and fixed to the core pin, the wound coil includes a wound portion and a lead-out portion, in the pressing the wound coil, the first and second pressing portions move toward the core pin to bring the inner surface of each of the first and second pressing portions into contact with the wound portion, thereby pressing the wound coil in a width direction, the first rotation of the first jig is performed in a first direction, based on a central axis of the first jig, the second rotation of the first jig is performed in a second direction opposite to the first direction, based on the central axis of the first jig, the first jig further includes first and second contact portions each connected to an outer surface of each of the first and second pressing portions, in the bringing the first jig and the second jig into contact with each other by the first rotation of the first jig, the first and second contact portions are in contact with the second jig, the second jig includes a holder, a rotation portion disposed on the holder, and a bearing disposed on the rotation portion, and in the bringing the first jig and the second jig into contact with each other by the first rotation of the first jig, the first and second contact portions are in contact with the bearing of the second jig.

* * * * *